(12) United States Patent
Liu et al.

(10) Patent No.: US 11,320,893 B2
(45) Date of Patent: May 3, 2022

(54) SYSTEMS AND METHODS FOR SOLAR ENERGY-BASED COMPUTATION

(71) Applicants: University of Tennessee Research Foundation, Knoxville, TN (US); Dominion Energy Inc., Richmond, VA (US)

(72) Inventors: Yilu Liu, Knoxville, TN (US); Robert Gardner, Midlothian, VA (US); Yuru Wu, Knoxville, TN (US)

(73) Assignees: UNIVERSITY OF TENNESSEE RESEARCH FOUNDATION, Knoxville, TN (US); DOMINION ENERGY INC., Richmond, VA (US)

( * ) Notice: Subject to any disclaimer, the term of this patent is extended or adjusted under 35 U.S.C. 154(b) by 82 days.

(21) Appl. No.: 16/946,521

(22) Filed: Jun. 25, 2020

(65) Prior Publication Data
US 2020/0409324 A1    Dec. 31, 2020

Related U.S. Application Data

(60) Provisional application No. 62/866,301, filed on Jun. 25, 2019.

(51) Int. Cl.
| | | |
|---|---|---|
| *G06F 1/329* | (2019.01) | |
| *G05B 19/042* | (2006.01) | |
| *G05F 1/67* | (2006.01) | |
| *G06Q 50/06* | (2012.01) | |

(52) U.S. Cl.
CPC .......... *G06F 1/329* (2013.01); *G05B 19/042* (2013.01); *G05F 1/67* (2013.01); *G06Q 50/06* (2013.01); *G05B 2219/2639* (2013.01); *H02J 2300/24* (2020.01)

(58) Field of Classification Search
CPC . G05B 19/042; G05B 2219/2639; G05F 1/67; G06Q 50/06; H02J 3/383; H02J 2003/24; Y02B 10/10
See application file for complete search history.

(56) References Cited

U.S. PATENT DOCUMENTS

| | | | | |
|---|---|---|---|---|
| 5,168,212 A * | 12/1992 | Byerley, III | ....... | G01R 29/0842 324/72 |
| 8,018,748 B2 * | 9/2011 | Leonard | ................ | H02J 3/385 363/95 |
| 8,774,007 B2 * | 7/2014 | Hussain | .............. | H02J 3/383 370/241 |
| 9,159,042 B2 * | 10/2015 | Steven | ............ | G06Q 10/06315 |
| 9,507,364 B2 * | 11/2016 | Sowder | .................... | G05F 1/67 |
| 9,641,021 B2 * | 5/2017 | Gong | ...................... | H02J 3/383 |
| 9,800,052 B2 * | 10/2017 | Li | ............................ | H02J 3/004 |
| 10,649,429 B2 * | 5/2020 | Orsini | ................ | G05B 19/042 |
| 2011/0283119 A1 * | 11/2011 | Szu | ........................ | G06F 1/3203 713/300 |

* cited by examiner

*Primary Examiner* — Crystal J Barnes-Bullock
(74) *Attorney, Agent, or Firm* — Myers Bigel, P.A.

(57) ABSTRACT

An apparatus includes a photovoltaic module and a computation module that is coupled to the photovoltaic module and is configured to receive power therefrom, the computation module being configured to communicate an active message to a controller in response to the computation module transitioning to a power on state and configured to receive a task command from the controller in response to communicating the active message to the controller.

20 Claims, 10 Drawing Sheets

SYSTEMS AND METHODS FOR SOLAR ENERGY-BASED COMPUTATION

CROSS-REFERENCE TO RELATED APPLICATION

The present application claims priority to U.S. Provisional Patent Application Ser. No. 62/866,301, filed Jun. 25, 2019, the entire content of which is incorporated by reference herein as if set forth in its entirety.

STATEMENT REGARDING FEDERALLY SPONSORED RESEARCH OR DEVELOPMENT

This invention was made with government support under contract number NSF EEC-1041877 awarded by the National Science Foundation. The government has certain rights in the invention.

BACKGROUND

The present disclosure relates to power systems for data centers, and, in particular, to powering data centers using photovoltaic electricity generation.

Conventional solar photovoltaic (PV) electricity generation generally relies on the generation of energy using solar PV panels connected in large arrays to inverters that are then connected to the electric grid. Between the PV panels that generate energy by converting solar energy into electrical energy (source) and the end user (load), several elements of infrastructure facilitate the transfer of energy between its source and its intended use. This infrastructure normally includes low voltage collector equipment, such as inverters that convert the generated direct current (DC) electricity to alternating current (AC) electricity, transformers that step up the AC electricity to a higher voltage for distribution or transmission, and transmission and/or distribution lines, collectively referred to as the electrical grid or power grid, for delivering the generated energy to end users. Many transformation points and inefficiencies may exist along this energy supply chain.

Conventional solar PV generation can also be highly variable and somewhat unpredictable as it is a stochastic process. This variability challenges conventional methods that grid operators use to balance power generation and load at all times. Nevertheless, utilities, independent generation developers, and individuals across the United States and around the world are investing heavily in solar energy, resulting in large block additions to the electrical grid each year.

While solar PV generation is growing on the source side of the equation, there is a sector on the load side that is also increasing significantly year-over-year at an accelerating pace: data centers. The ever-increasing demand for cloud services, streaming services, e-commerce, social media, to name a few, outpaces itself each year. At the same time, many data center owners and operators are demanding clean and renewable energy. In their demand for renewables, they often turn to solar PV. Data centers are compact energy sinks compared to the sprawling nature of solar PV energy sources (also called solar farms) so data center owners and operators often turn to a utility as an intermediary for renewable energy. The utility then develops an annualized energy-based contract with the data center to match annual energy usage of a data center or set of data centers with the annualized energy output of a solar farm or set of solar farms.

Three key drawbacks may exist with this construct as it exists today: First, these contracts consider energy in annualized lump sums. That is, there is no contemplation of the time of use. While solar farms only produce energy during the day, data centers are 24/7 operations that continually demand energy. Hence, real energy delivered to data centers may not always be in the form of solar energy. While the sum totals of energy use over a period of time may balance out contractually with solar production, when solar energy is unavailable, other sources of energy (coal, natural gas, nuclear, wind, etc.) are used to power the data centers. Data center owners and operators understand this, so oftentimes contracts are established with solar farm owners to purchase the entire annualized energy output from a solar farm facility. This contract is then used as an offset. Today, data center energy demand is not scaled to match the variable production of a renewable energy source. This first drawback is the lack of an ability to match firm data center energy demand with variable renewable energy production.

The second drawback involves the latent inefficiencies involved in transmitting energy from solar farms that are often located in remote areas where land is available and inexpensive to data centers that are often located in areas of dense fiber infrastructure. Data centers are often in urban or suburban areas where real estate values are elevated. Data centers are compact energy sinks. Data centers can consume several tens of megawatts per acre. Solar PV array require several acres to produce a megawatt of power. Therefore, co-locating solar PV arrays and data centers is not an effective solution. While rooftop solar PV on a data center may offset a small percentage of the data center's energy demand, there is no equity between an ability to generate power using solar PV arrays and meeting power demands on site at a data center.

The third drawback involves power grid operations. In striking the balance between growing data center demand and accelerating investments in variable solar PV generation, the power grid serves as the energy arbitrator. Growing demand by 24/7 operations like data centers and the desire to offset their annualized energy demand with solar PV arrays practically manifests itself as an over-production of energy during daylight hours with a double-challenge to the electrical grid at the end of the day. As solar PV generation is fading, power grid demand is ramping up. This results in an overall fast ramping of load, which is already becoming a challenge. In some regions this challenge is referred to as "the duck curve." The third drawback is use of rigid electrical infrastructure to balance variable solar PV with data center demand.

SUMMARY

In some embodiments of the inventive concept, an apparatus comprises a photovoltaic module and a computation module that is coupled to the photovoltaic module and is configured to receive power therefrom, the computation module being configured to communicate an active message to a controller in response to the computation module transitioning to a power on state and configured to receive a task command from the controller in response to communicating the active message to the controller.

In other embodiments, the task command comprises computer readable program code module. The computation module is further configured to execute the computer readable program code module, further configured to generate a result based on the execution of the computer readable program code module, and further configured to communicate the result to the controller.

In still other embodiments, the apparatus further comprises a voltage sensor that is configured to determine a voltage level applied to the computation module. The computation module is further configured to transition to the power on state responsive to the voltage level applied to the computation module exceeding a defined threshold. The computation module is further configured to transition to a standby state responsive to the voltage level applied to the computation module being less than the defined threshold.

In still other embodiments the apparatus further comprises a rechargeable energy storage unit that is configured to receive power from the photovoltaic module. The computation module is further configured to receive power from the rechargeable energy storage unit and the photovoltaic module.

In still other embodiments, the computation module is further configured to communicate with the controller while in the standby state.

In still other embodiments, the computation module is communicatively coupled to the controller via the Transmission Control Protocol/Internet Protocol (TCP/IP).

In still other embodiments, the computation module is attached to a surface of the photovoltaic module.

In some embodiments of the inventive concept, a system comprises a data center controller and a plurality of solar servers. Each of the plurality of solar servers comprises a photovoltaic module and a computation module that is coupled to the photovoltaic module and is configured to receive power therefrom, the computation module being configured to communicate an active message to the data center controller in response to the computation module transitioning to a power on state and configured to receive a task command from the data center controller in response to communicating the active message to the controller.

In further embodiments, the data center controller is configured to divide a work unit into a plurality of task commands and configured to communicate the plurality of task commands to at least a portion of the plurality of solar servers.

In still further embodiments, each of the plurality of task commands comprises a computer readable program code module and ones of the plurality of computation modules corresponding to the at least the portion of the plurality of solar servers are further configured to execute, at least partially in parallel, the plurality of computer readable program code modules, respectively, further configured to generate a plurality of results based on the execution of the plurality of computer readable program code modules, respectively, and further configured to communicate the plurality of results to the data center controller.

In still further embodiments, each of the plurality of solar servers further comprises a voltage sensor that is configured to determine a voltage level applied to the computation module. The computation module is further configured to transition to the power on state responsive to the voltage level applied to the computation module exceeding a defined threshold and to transition to a standby state responsive to the voltage level applied to the computation module being less than the defined threshold.

In still further embodiments, each of the plurality of solar servers further comprises a rechargeable energy storage unit that is configured to receive power from the photovoltaic module. The computation module is further configured to receive power from the rechargeable energy storage unit and the photovoltaic module.

In still further embodiments, the computation module is further configured to communicate with the data center controller while in the standby state.

In still further embodiments, the computation module is communicatively coupled to the data center controller via the Transmission Control Protocol/Internet Protocol (TCP/IP).

In still further embodiments, the computation module is attached to a surface of the photovoltaic module.

In some embodiments of the inventive concept, a method comprises receiving power at a computation module from a photovoltaic module; communicating an active message from the computation module to a controller in response to the computation module transitioning to a power on state; and receiving a task command at the computation module from the controller in response to communicating the active message to the controller.

In other embodiments, the task command comprises computer readable program code. The method further comprises executing the computer readable program code using the computation module; generating a result a result based on the execution of the computer readable program code module; and communicating the result to the controller.

In still other embodiments, the method further comprises determining a voltage level applied to the computation module using a voltage sensor; transitioning the computation module to the power on state responsive to the voltage level applied to the computation module exceeding a defined threshold; and transitioning the computation module to a standby state responsive to the voltage level applied to the computation module being less than the defined threshold.

In still other embodiments, the method further comprises storing power in a rechargeable energy storage unit that is coupled to the photovoltaic module; and receiving power at the computation module from the rechargeable energy storage unit and the photovoltaic module.

In still other embodiments, the method further comprises communicating with the controller while the computation module is in the standby state.

It is noted that aspects described with respect to one embodiment may be incorporated in different embodiments although not specifically described relative thereto. That is, all embodiments and/or features of any embodiments can be combined in any way and/or combination. Moreover, other methods, systems, articles of manufacture, and/or computer program products according to embodiments of the inventive subject matter will be or become apparent to one with skill in the art upon review of the following drawings and detailed description. It is intended that all such additional apparatus, systems, methods, articles of manufacture, and/or computer program products be included within this description, be within the scope of the present inventive subject matter, and be protected by the accompanying claims. It is further intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
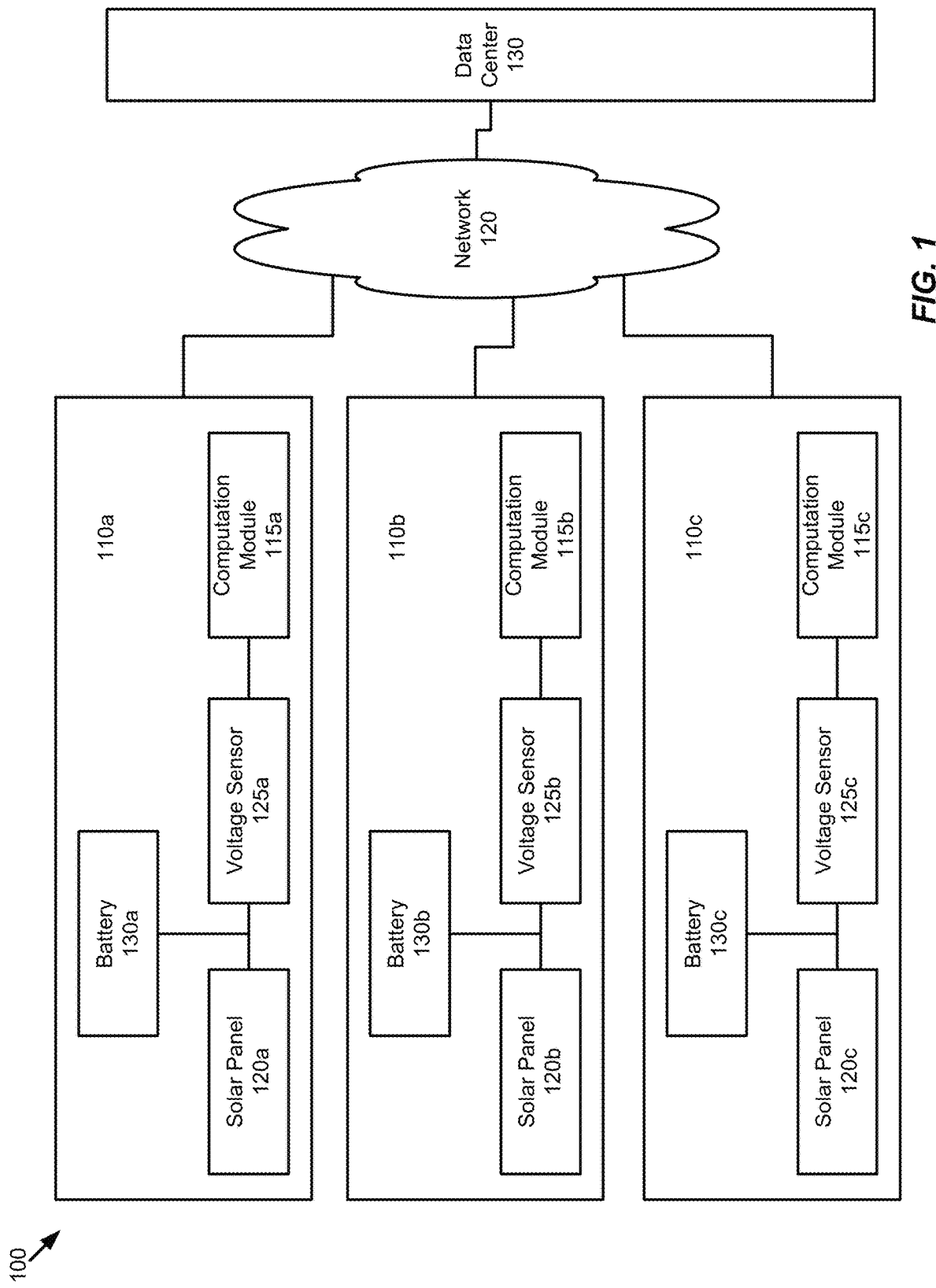
FIG. 1 is a block diagram that illustrates a computation network environment in accordance with some embodiments of the inventive concept.

In the following detailed description, numerous specific details are set forth to provide a thorough understanding of embodiments of the present disclosure. However, it will be understood by those skilled in the art that the present invention may be practiced without these specific details. In some instances, well-known methods, procedures, components and circuits have not been described in detail so as not to obscure the present disclosure. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

As used herein, the term a data processing system may include, but it is not limited to, a hardware element, firmware component, and/or software component.

Some embodiments of the inventive concept stem from a realization of the need to match an accelerating demand for data centers and the cloud services they provide with renewable solar PV energy production. Some embodiments of the inventive concept may serve the nucleus of a solution to match solar PV energy production and data center services. In some embodiments, the nucleus of a data center, which may be a single array of processors, is combined with the nucleus of a solar PV farm, which may be a single PV array. This integration of technologies, when scaled, may move the arbitration of energy variability from a rigid and aging electrical grid and transfers the management of that variability to a growing, flexible, fungible, redundant, ever-rejuvenating cloud services platform. Essentially, by directly integrating data processing power with solar arrays, embodiments of the inventive concept may move the problem of managing highly variable solar PV energy production from being an electric infrastructure problem that is difficult and expensive to solve to being a data problem that is relatively simple and inexpensive to solve. Instead of addressing this variability problem with copper and iron, embodiments of the inventive concept may address it with fiber optic cables and solar sever arrays.

According to some embodiments of the inventive concept, apparatus, systems, and methods of solar energy production using a design of solar photovoltaic (PV) structures is provided. In some embodiments, solar energy is used to power computing work and transmit the computation result. Rather than transmit real power in the form of electrical energy (e.g., current and voltage), data transmission in the form of optical signals via fiber optic cables is much faster, more efficient, and more effective.

In some embodiments, one computation module is attached, either directly or indirectly, to a surface of a solar PV module or panel and is powered by the solar energy generated therefrom. The computation module may transition to an active or power on state when the panel receives sufficient sunlight and may then be available to perform computing operations. At night, or in sub-optimal weather conditions, such as rainy or cloudy days, the computation module may transition switches to a sleep or standby state and stop working. While in the active or power on state, the computation results may be transmitted to a data center controller in the cloud, for example, using the Transmission Control Protocol/Internet Protocol (TCP/IP) via Ethernet cable. A cloud-based data center controller may be configured to modify and control the computation module remotely. In some embodiments, a rechargeable energy storage unit, such as a battery, may be used to store energy generated by the PV module. This may allow the computation module to receive power during times the PV module is not generating electricity and may allow the computation module to be detectable and adjustable by the data center controller when the computation module is in a standby or sleep mode.

Embodiments of the inventive concept may allow computation power to be arranged easily. A cloud-based service may divides a computation mission, such as a work unit, into multiple task commands and may oversee several solar servers, each including a computation module, a parallel computing service. Because the locations of the solar servers may be distributed geographically across the globe, when one module transitions to standby or sleep mode due to insufficient light incident upon the local solar PV array, its work can be re-assigned via the data center controller to another available solar server automatically.

By reducing or eliminating the need for electrical infrastructure, solar PV farms may become less costly and intrinsically safer. Businesses, industries, universities, and even local communities, schools, and families can establish a solar station in any suitable place. Compared to the cost of conventional solar PV energy generation methods, a solar-based server array, no matter how large or small, may be less expensive to maintain. Embodiments of the inventive concept may be as easy to maintain as a router or Ethernet switch connected to an Ethernet cable. Moreover, the data transmission via an optical fiber network may be more efficient with fewer losses than the electrical energy alternative. Because of the intrinsic redundancy and flexibility of the cloud, a failure, fault, or error in one solar server module will not degrade the overall performance of the system of solar servers. Data may be protected using a variety of different security protocols. With the Internet connection between solar servers and a data center controller, a data center may use the solar power from around the world to do its work.

Some embodiments of the inventive concept may allow solid state servers, i.e., computation modules, to be integrated directly into solar PV arrays. Adding a solid state "compute" and/or data storage substrate to a solar PV panel may allow for the creation of a scalable, directly-powered, renewable, and sustainable data center. IN some embodiments, solar PV panels be designed and built to not only capture power from the sun, but to also immediately use that power to run a computational process or store the power in a rechargeable energy storage unit, such as a rechargeable battery, all within one stackable, modular, and self-enclosed device/apparatus—a solar server. In some embodiments, the only interface between the outside world and a solar server, an array of solar servers, and/or a farm of solar servers may be a fiber (or bundled fiber) data link. The end result, depending on the scale of implementation, would be either a server or server farm with compute power directly proportional to the solar energy incident upon the panel/array/site.

In contrast with conventional solar farms, data center, and/or co-located solar farms and data centers, embodiments of data centers and/or solar servers lack entanglement with electrical infrastructure. That is, there is no need to engineer the AC electrical grid to provide one or more facilities to support a data center and one or more solar servers as the interface between the data center and the one or more solar servers is via the Internet. This distinction may imply, but is not limited to, the following characteristics: no utility interconnection agreements, no inverters, no impacts to the electric grid, no two-way power flows on electrical distribution infrastructure to be managed, no protection or relaying to be engineered and coordinated, and/or no grid interaction. Embodiments of data centers and/or solar servers according to the inventive concept may serve customers that wish to interconnect a data center onto a utility's grid while also wanting the data center to be powered by 100% renewable energy. Typically, powering a data center with renewable energy is accomplished by two very large, grid-altering investments: the construction of distribution capacity to interconnect and serve the data center and the construction of distribution capacity to interconnect and serve the solar farm. Using solar server technology according to some embodiments of the inventive concept, none of the electrical infrastructure upgrades may be needed. Instead, the electrical grid may be viewed as being "out of the loop." Solar servers can be located without regard for availability of electrical utility infrastructure.

Solar PV panels develop a direct current (DC) voltage across an applied load as photons from the sun interact with layers of semiconducting materials within the solar PV panel in turn causing freed electrons to flow as a current. The DC power generated by a solar panel varies based upon the intensity of light incident on the panel. The DC outputs of solar PV panels are bussed together and eventually inverted back into alternating current (AC) where the site can be interconnected and integrated into the AC electric grid. Some embodiments according to the inventive concept may allow for directly transforming solar energy into computational power and/or data storage capacity to serve the cloud for a variety of reasons including, but not limited to, the following:

1. Efficiency: Inverter losses, transformation losses, and grid losses may be reduced or eliminated from the system. Consider the stacked losses involved in the various processes involved in moving solar energy from a remote plot of land to "the grid." Each inverter takes its slice of the energy pie with the losses adding up over in proportion to distance. The layers of "step-up" transformers at the solar site also have their losses. When energy is immediately converted to computational power or stored, most electrical losses can be avoided—except those losses involved in the solar panels (PV modules) themselves.

2. Cost: Similar to the efficiency argument, eliminating electrical infrastructure, along with all of the protection, monitoring, and control equipment may reduce the cost of solar PV farm developments. Only three costs may remain: land, communications, and solar PV server equipment. Arguably the costs of the communications and equipment may increase. The solar server may have all of the communications and networking demands of a data center. However, these costs pale in comparison to the costs of medium and high-voltage infrastructure. Further, the costs of the solar server PV panels or modules may be higher. Again, these panels or PV modules are doing double duty, providing two-for-one value, so they will cost more. No longer are the solar PV arrays energy generators alone, they are also servers. The bundling of technology may have an associated cost. Once developed at scale, these costs may be negligible. The cost of fiber communications infrastructure in dollars per mile may be a small fraction of the costs of three-phase distribution infrastructure in dollars per mile.

3. Scalability: Whether standing alone as a single 300W solar server all encapsulated in a single panel, or stacked together as a 30MW solar server farm, embodiments of the inventive concept may be highly scalable. The limits may be land availability and communications infrastructure. As an example, consider the case of residential integration where a homeowner wants rooftop solar servers. Installation may involve attaching the solar server panels to the roof and connecting a fiber interface. No inverters need to be attached to the house, no power cables bussed to the roof, no net metering agreements, and no interconnection agreements with the utility. Advantageously, the electric utility bill would not be affected. However, if agreements were developed with the telco/cable/Internet service provider, the homeowner may enjoy a lower cable or Internet bill because data services may be supplemented by the rooftop solar PV server array. Embodiments of the inventive concept may be scalable from micro-installations to large "utility-scale" installations, and the technology may readily scale—like a stack.

4. Conformability: The computational throughput of a solar server may be highly variable as it will not function at night. If a weather front passes through a particular location, large tracts of solar servers may be rapidly affected. In these cases, geographical diversity may be important to successful implementation of a network of solar servers. The balancing factor is that the cloud, also known as the World Wide Web, already exists. A global data superhighway has already been built—life and commerce has generally come to depend on it. The Internet is massive, redundant, and dynamic. And, it is self-healing. Therefore, while a solar server in eastern North Carolina may succumb to a cold front, the processes of that solar server may be transferred to another solar server already on the back side of the weather system in Kentucky. As night falls on the west coast, the sun is rising in Australia. In short, the Internet, which spans the globe, may be a far fairer surrogate for managing variable processes than the electrical grid. A global electrical grid does not exist and is not practical. In general, energy must be generated/consumed within the electrical interconnection in which it is consumed/generated, which is not the case with the internet. Today, data centers already leverage high levels of geographical diversity and process continuity to handshake processes around the globe.

5. Powering the fourth emerging consumer of energy: Three uses of energy have dominated human history: light, heat, and transportation. Based upon trends, the use of energy for heat and light has peaked. Some argue the same for transportation. However, there is an emerging consumer of energy and this is our data infrastructure. Can or will this ever peak? Time will tell. Combining solar energy and "the cloud" (software and services provided via the Internet) may provide significant benefits. This contention is based upon complementary advantages and challenges. One complementary advantage is "free" energy to power the cloud from the sun. However, the data cloud has capabilities that complement the challenges of collecting solar energy on the surface of the earth. Vast swaths of industry professionals in the form of engineers, consultants, physicists, regulators, contract administrators, accountants, and policy makers are wrangling with the issues that solar energy brings to the grid. The impacts of solar availability and variability on the grid have yet to be understood—even at the most basic levels. How do we deal with two way power flows? Do we need batteries for solar "smoothing?" What about grid stability? What about load erosion? Utility death spiral? What capacity factor can be assigned to solar? How can the behavior of ubiquitous and complex inverters be modeled? Perhaps solar energy was never meant for the electrical grid? Maybe solar power can be directly captured and consumed by the fourth emergent use of energy—the cloud. Why challenge conventional utility paradigms that work well? Data processes are by their very nature flexible, plastic, and fluid.

Cost Savings:

Solar servers may be cost effective because they decouple the generation of energy and conversion of energy into a data and/or storage service from the electrical grid. Variability of solar generation may be dealt with in an "information layer" as opposed to an "energy layer."

Environmental/Sustainability:

Solar servers greatly reduce the installation, deployment, and funding hurdles associated with integrating solar PV into the grid. Grid integration goes away. Today, grid integration and electrical infrastructure construction activities take up a large share of the time and costs of deploying solar power sources. Solar servers can be constructed and integrated as fast as land and data circuits (e.g., fiber) are available. Solar servers may not generate energy that goes back onto the grid. But they may provide a data service more efficiently. Solar servers may not provide energy to the electrical grid, but they may keep energy from being demanded of the electrical grid in the form of a reduction in data center load.

Embodiments of the inventive concept may thwart solar energy from making it onto the electrical grid—at least in the near term. Arguably, every Watt of solar server capacity can serve an immediate emerging data need. That is, the data cloud is growing faster than the pace of solar development. This tends to keep the challenges of solar energy off of the grid. Keeping the two-way power flows and dynamic frenzy of solar energy off of the grid is analogous to converting a busy two-way street into a one-way energy highway.

Embodiments of the inventive concept may, therefore, provide an approach for converting solar energy directly into a useful service. Most useful services, e.g., manufacturing processes, are typically not conformable with a variable energy source. It may be difficult and/or not feasible to connect a solar farm to a large industrial process and expect the system to balance. A constant process generally needs constant power. Solar energy is typically too variable and unpredictable. However, the "data cloud" is by nature plastic, amorphous, redundant, and ethereal. Data processes are routinely transferred around the globe as needed. The cloud can, thus, be powered by a variable energy source. This entry cuts out the electrical grid, the middleman, from the transaction between renewable solar energy and data centers.

Referring to FIG. 1, a computation network 100, according to some embodiments of the inventive concept, comprises a plurality of solar servers 110a, 110b, and 110c that are coupled to a data center 130 by way of a network 120. Each of the solar servers 110a, 110b, and 110c may include a computation module 115a, 115b, and 115c, a solar panel 120a, 120b, and 120c, which is coupled to the computation module 115a, 115b, and 115c through a voltage sensor 125a, 125b, and 125c. The computation module 115a, 115b, and 115c may be configured as a data processing system with a processor, memory, and one or more control programs that facilitate the execution of one or more computational task commands that may be received from the data center 130. The solar panel 120a, 120b, and 120c may include one or more PV arrays that are configured to generate electricity in response to the sun's radiation being incident thereon. The voltage sensor 125a, 125b, and 125c may be configured to determine when the output voltage from the solar panel 120a, 120b, and 120c is sufficiently high, i.e., exceeds a defined threshold, that the computation module 115a, 115b, and 115c may transition into a power on or active state. When the computation module 115a, 115b, and 115c is in the power on or active state, then it may send an active message to a controller in the data center notifying the data center 130 controller that the computation module 115a, 115b, and 115c is available to perform a computational task. When the voltage output from the solar panel 120a, 120b, and 120c is less than the defined threshold to support transitioning the computation module 115a, 115b, and 115c into the power on or active state, then the computation module 115a, 115b, and 115c may transition into a standby or inactive state in which the computation module 115a, 115b, and 115c, is not available to computational tasks received from the data center 130 controller. In some embodiments, a rechargeable energy storage unit, such as the battery 130a, 130b, and 130c may be used to store energy from the solar panel 120a, 120b, and 120c to support operation of the computation module 115a, 115b, and 115c when the power output form the solar panel 120a, 120b, and 120c is insufficient, i.e., voltage output is below the defined threshold. This may allow the computation module 115a, 115b, and 115c to communicate with the data center 130 controller when the computation module 115a, 115b, and 115c is in the standby or inactive state. As a result, the data center 130 controller may manage all of the solar servers 110a, 110b, and 110c whether the computation modules 115a, 115b, and 115c are in a power on/active or standby state. A GPS or other type of geolocation device may also be included in the solar servers 110a, 110b, and 110c, which may be used, for example, by the data center 130 controller to determine the exact location of the solar server 110a, 110b, and 110c and evaluate such things as weather, cloud cover, physical obstruction due to buildings, etc.

The solar servers 110a, 110b, and 110c may communicate with the data center 130 over the network 120 using, for example, the TCP/IP protocol. The network 120 may be a global network, such as the Internet or other publicly accessible network. Various elements of the network 120 may be interconnected by a wide area network, a local area network, an Intranet, and/or other private network, which may not be accessible by the general public. Thus, the communication network 120 may represent a combination of public and private networks or a virtual private network (VPN). The network 120 may be a wireless network, a wireline network, or may be a combination of both wireless and wireline networks. In accordance with some embodiments of the inventive concept, the solar servers 110a, 110b, and 110c may be located in geographically diverse locations to increase the probabilities that one or more of the solar servers 110a, 110b, and 110c transitions to a power on or active state due to sufficient radiation from the sun being incident on the solar panels 120a, 120b, and 120c. Thus, these locations may be residential, industrial, urban, rural, with placement considerations being accessibility to sunlight and access to the Internet for communication. It will be further understood that although three solar servers 110a, 110b, and 110c are illustrated in FIG. 1, fewer or more solar servers 110a, 110b, and 110c may be used in accordance with various embodiments of the inventive concept. The solar servers 110a, 110b, and 110c are communicatively coupled to the data center 130 and may be physically isolated. This may reduce or eliminate the influence of the electrical power grid and may protect the solar servers 110a, 110b, and 110c and/or the data center 130 when one or more of the elements of the computation network 100 has a problem.

Although FIG. 1 illustrates an example computation network 100, it will be understood that embodiments of the inventive concept are not limited to such configurations, but are intended to encompass any configuration capable of carrying out the operations described herein.

Figure 2:
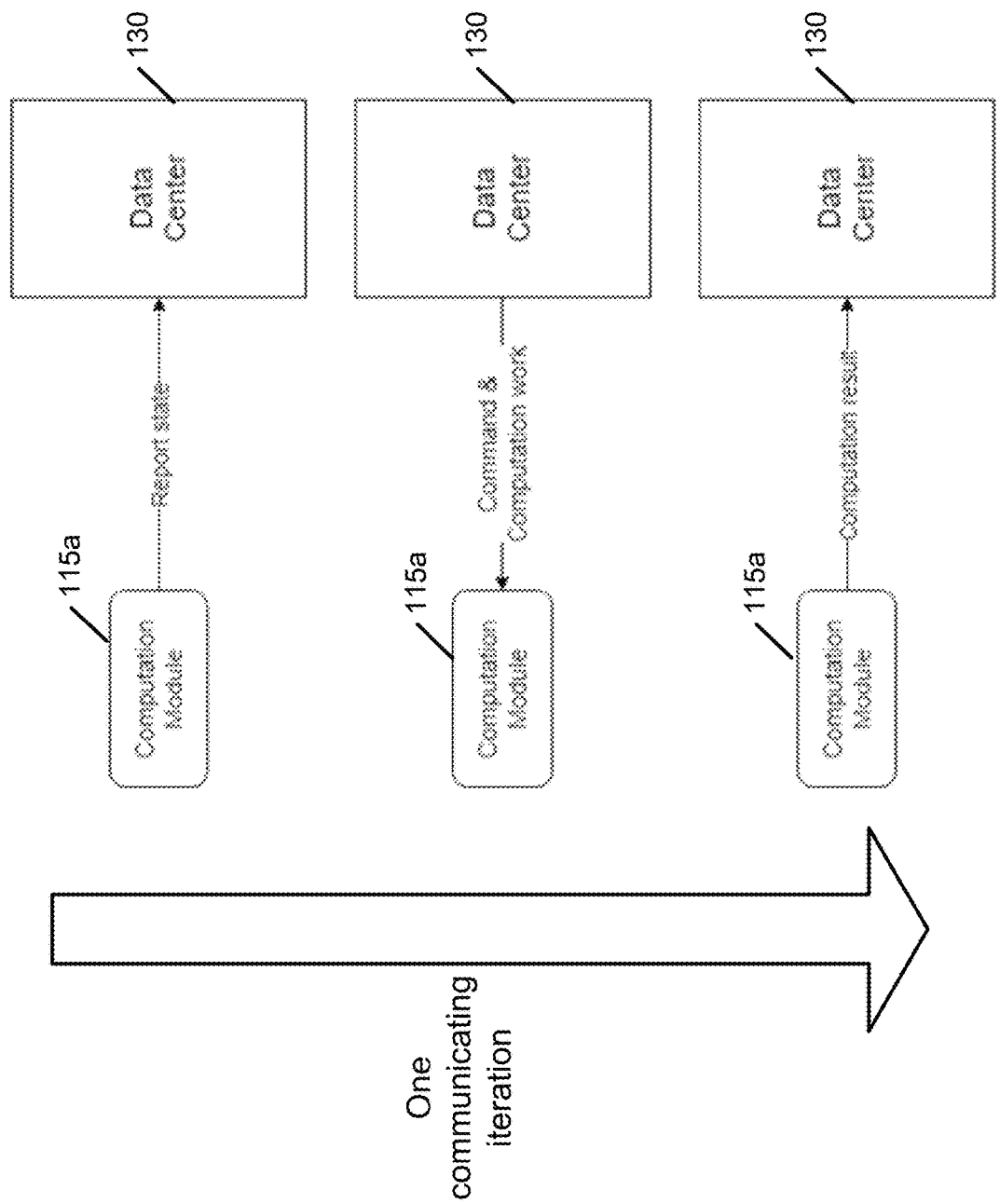
FIG. 2 is a message flow diagram that illustrates operations of the computation network of FIG. 1 in accordance with some embodiments of the inventive concept.
Figure 3:
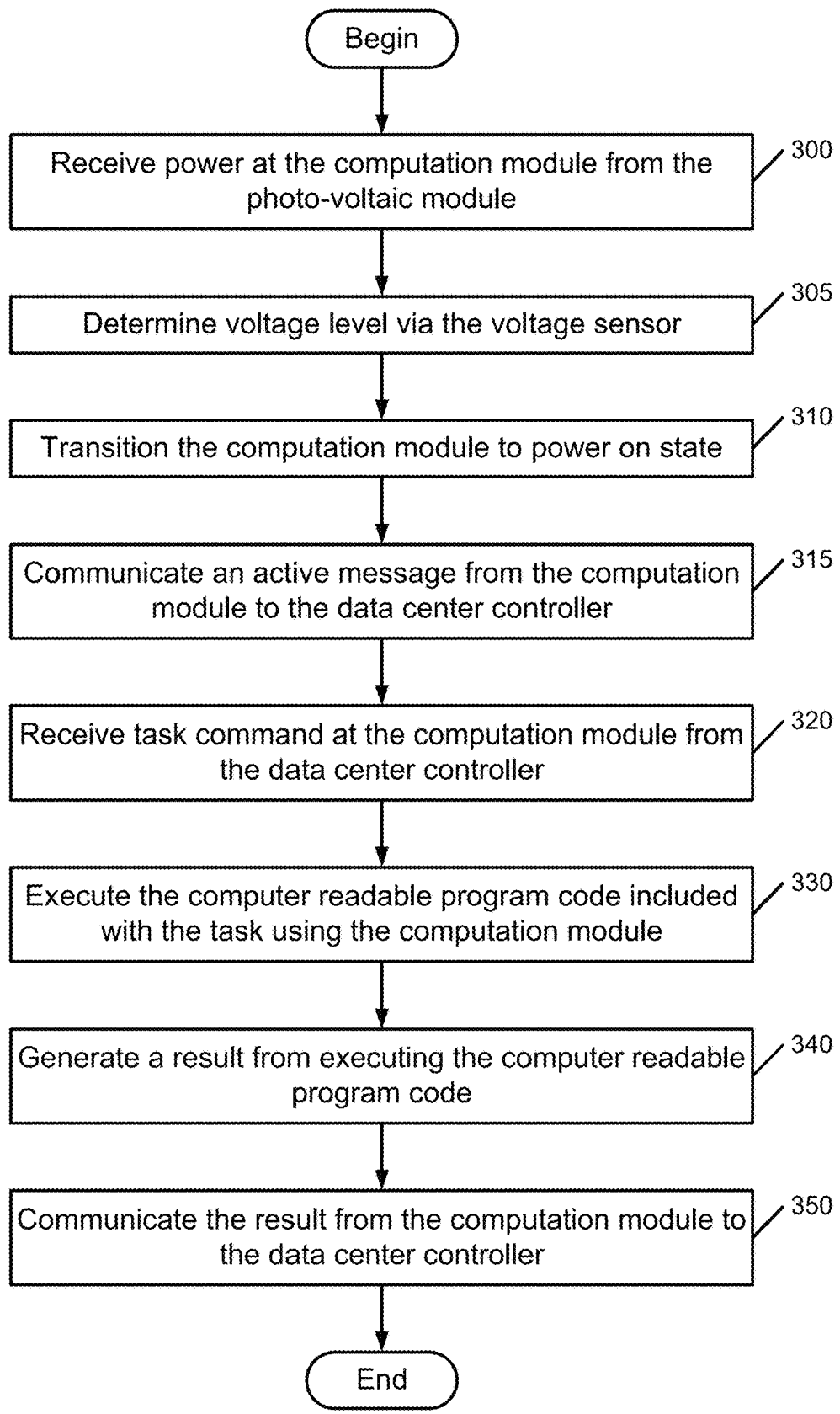
FIG. 3 is a flowchart that illustrates operations of the computation network of FIG. 1 in accordance with some embodiments of the inventive concept.

FIG. 2 is a message flow diagram and FIG. 3 is a flowchart that illustrates example operations of the computation network 100 in accordance with some embodiments of the inventive concept. The example in FIG. 2 is based on communications between the data center 130 controller and the solar panel 110a, but the operations described relative thereto are applicable to any of the solar panels 110a, 110b, and 110c. Referring now to FIG. 3, operations begin at block 300 where the computation module 115a receives power from the photovoltaic solar panel 120a. The voltage sensor 125a determines the voltage level output from the solar panel 120a and whether the voltage level exceeds a defined threshold sufficient to transition the computation module 115a to a power on or active state at block 305. At block 310, the computation module transitions to the power on state 310 when the voltage level exceeds the defined threshold. This triggers a report to the data center 130 controller that the solar server 110a is now in a power on/active state and ready to accept computational tasks. Thus, as shown in FIG. 2 and block 315 of FIG. 3, an active message is communicated from the computation module 115a to the data center 130 controller. As shown in FIG. 2 and block 320, the computation module 115a receives a task command from the data center 130 controller. The task command may include one or more commands along with computer readable program code for execution and associated data. The data center 130 controller may be configured to divide a work unit into one or more computational tasks that can be communicated to the various solar servers for execution. As these computational tasks may be executed at least in part in parallel among the multiple solar servers 110a, 110b, and 110c, the work unit may be performed more efficiently and faster than if it was executed in serial fashion on a single processing unit. The computation module 115 executes the computer readable program code included with the task at block 330 and generates a result from the execution operation at block 340. As shown in FIG. 2 and block 350 of FIG. 3, the result from executing the computer readable program code provided through the task command is communicated to the data center 130 controller at block 350. These operations may be viewed as one communication iteration between a solar panel 110a, 110b, and 110c and the data center 130 controller.

Figure 4:
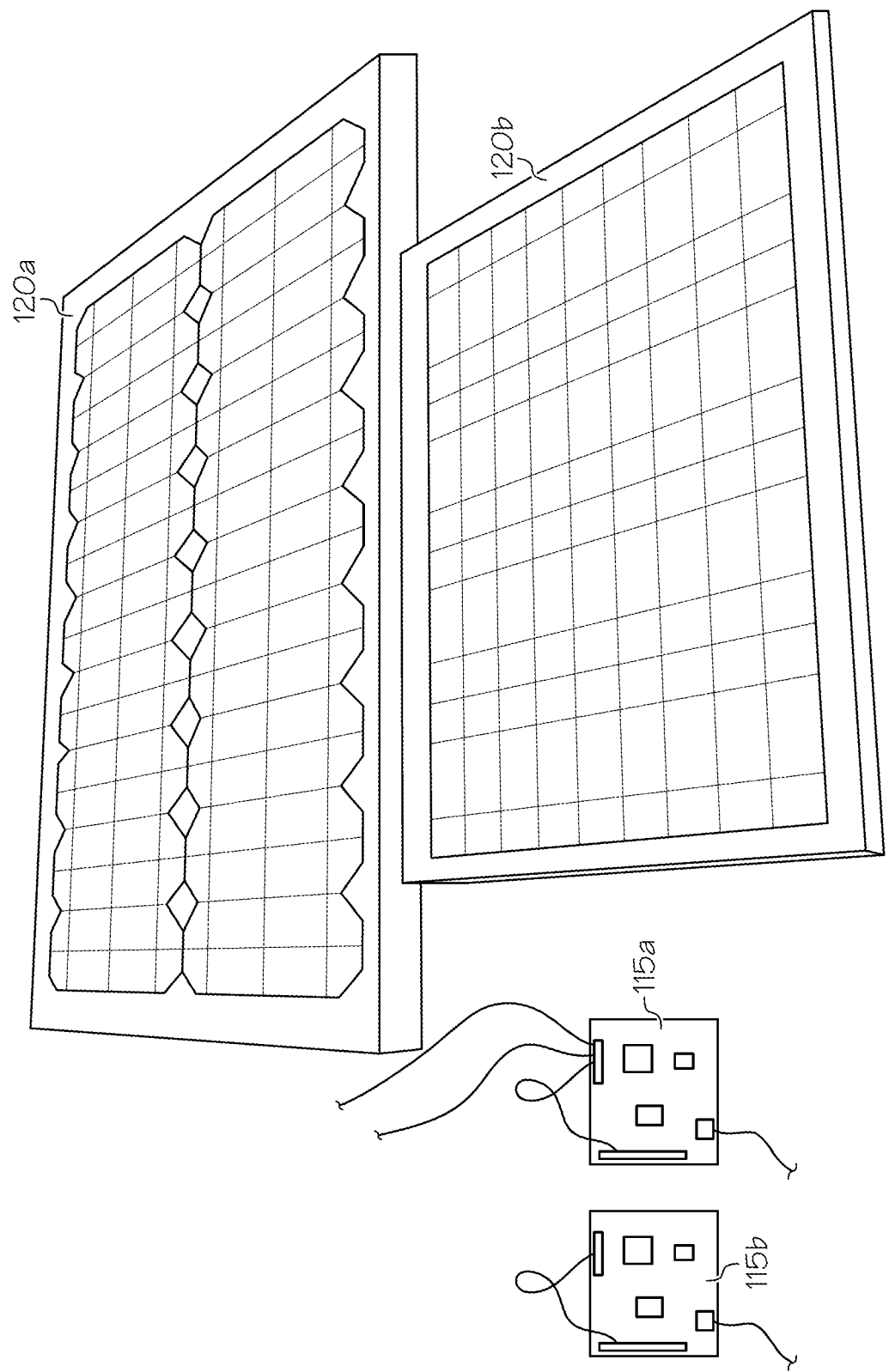
FIG. 4 is a diagram illustrating two solar panels containing one or more photovoltaic modules along with two associated computation modules in accordance with some embodiments of the inventive concept.

FIG. 4 is a diagram illustrating two solar panels containing one or more photovoltaic modules along with two associated computation modules. As shown in FIG. 4, the two solar panels 120a and 120b are separated from their associated computation modules 115a, and 115b for purposes of illustration. The computation modules 115a and 115b may be fastened to surfaces of the solar panels 120a and 120b, respectively, using a mechanical attachment technique, such as, but not limited, one or more screws, clips, fasteners, adhesives, or the like. The computation modules 115a and 115b and the solar panels 120a and 120b, respectively, may, in some embodiments, share a common monolithic housing. By joining the computation modules 115a and 115b to the solar panels 120a and 120b, the resulting structure may be moved, transported, positioned, etc. as a single unit.

Figure 5:
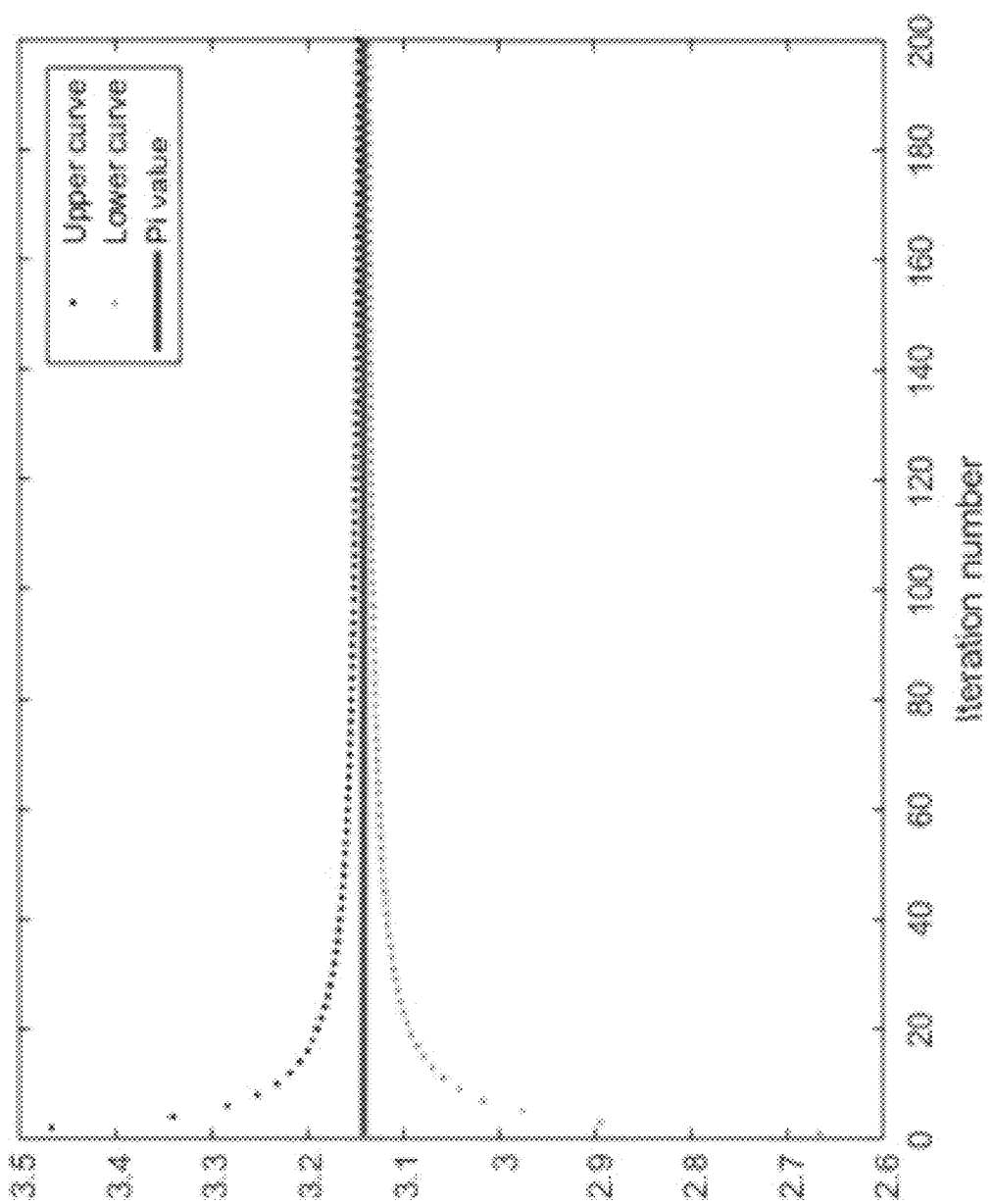
FIG. 5 is a graph illustrating the computation of Pi in accordance with some embodiments of the inventive concept.

Embodiments of the inventive concept may be illustrated by way of example with respect to computing the value of Pi. FIG. 5 is a graph illustrating the computation of Pi based on the formula set forth as Equation 1 below:

$$\pi = 4\left(1 - \frac{1}{3} + \frac{1}{5} + \cdots + \frac{(-1)^n}{2n+1}\right) \qquad \text{EQ. 1}$$

The computation can be performed with successive iterations of Equation 2:

$$\pi = 4\sum_n \frac{(-1)^n}{2n+1} = 4\sum_n a_n \qquad \text{EQ. 2}$$

At each iteration, the computation module 115a, 115b, and 115c needs only to calculate the value of $a_n$ and send the value to the data center 130 controller. The data center 130 controller may sum up the values to get an approximation of Pi.

Figure 6:
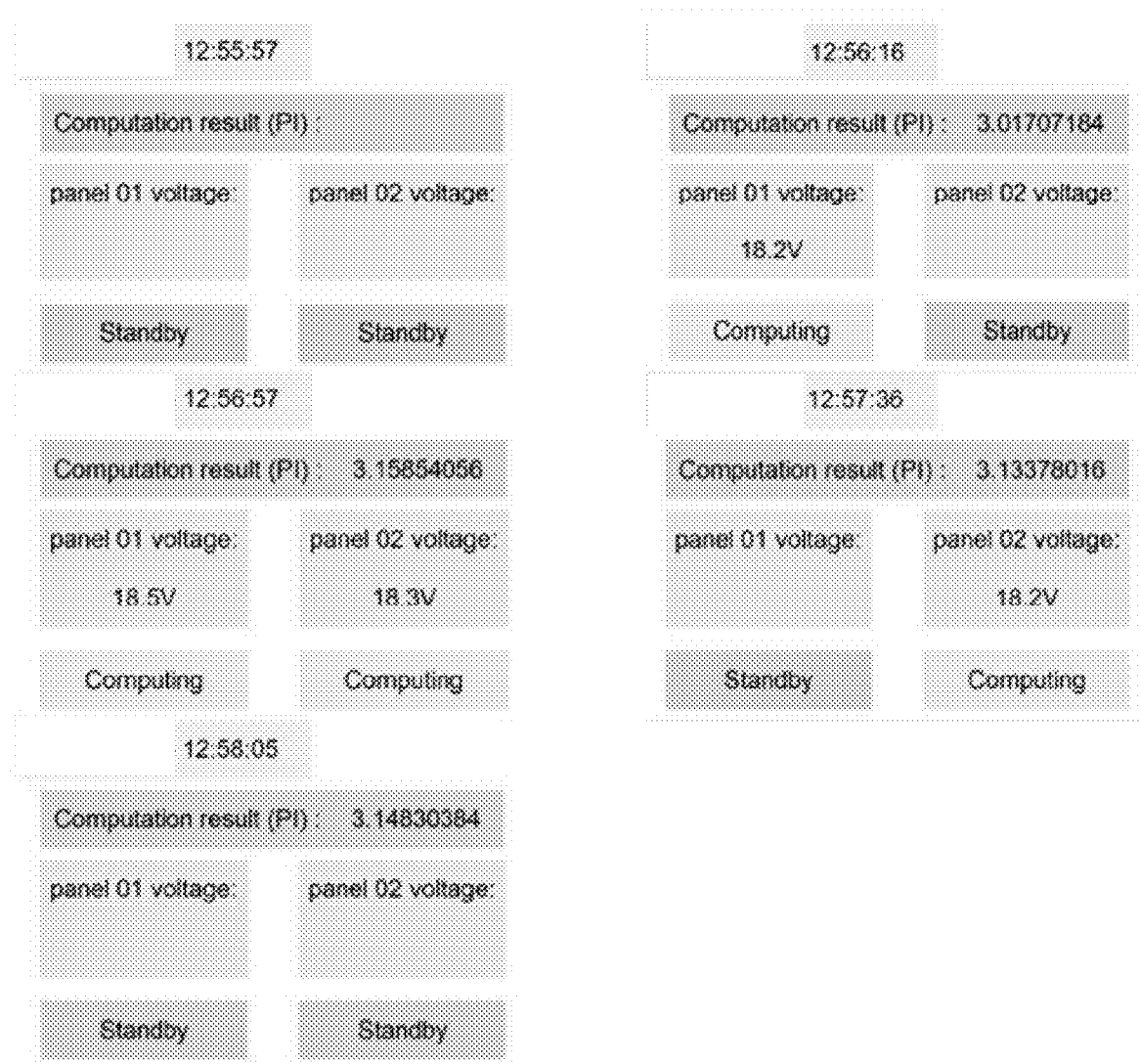
FIG. 6 is a block diagram illustrating the computation of Pi using two solar servers in accordance with some embodiments of the inventive concept.
Figure 7:
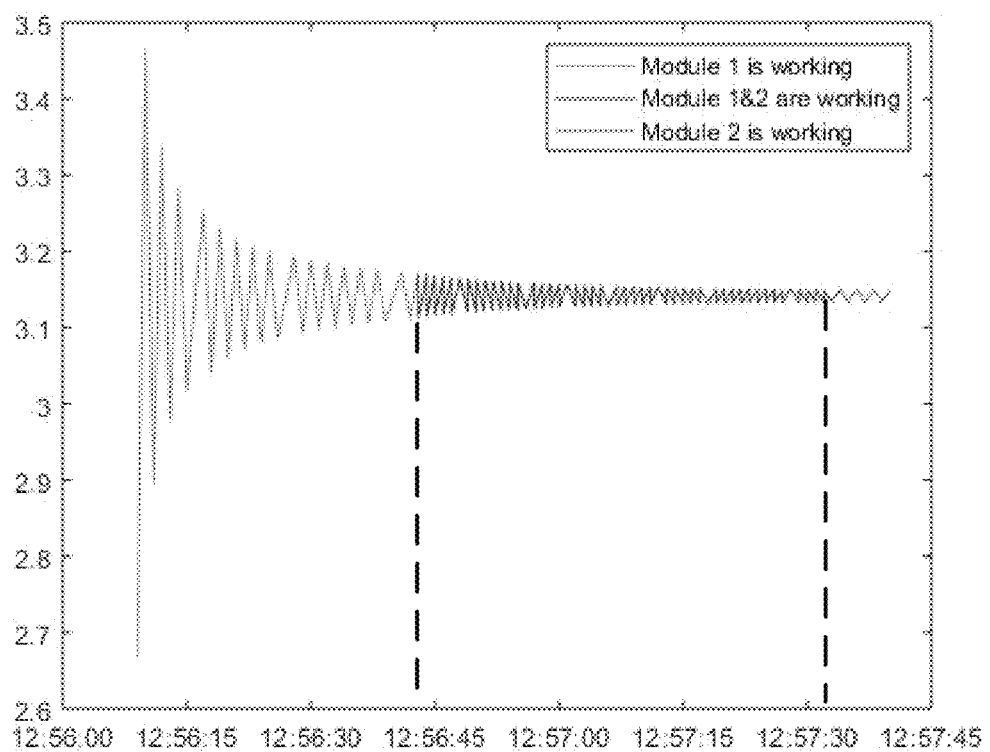
FIG. 7 is a graph showing the determination of Pi over time as one or both of the solar servers of FIG. 6 are performing computations in accordance with some embodiments of the inventive concept.
Figure 8:
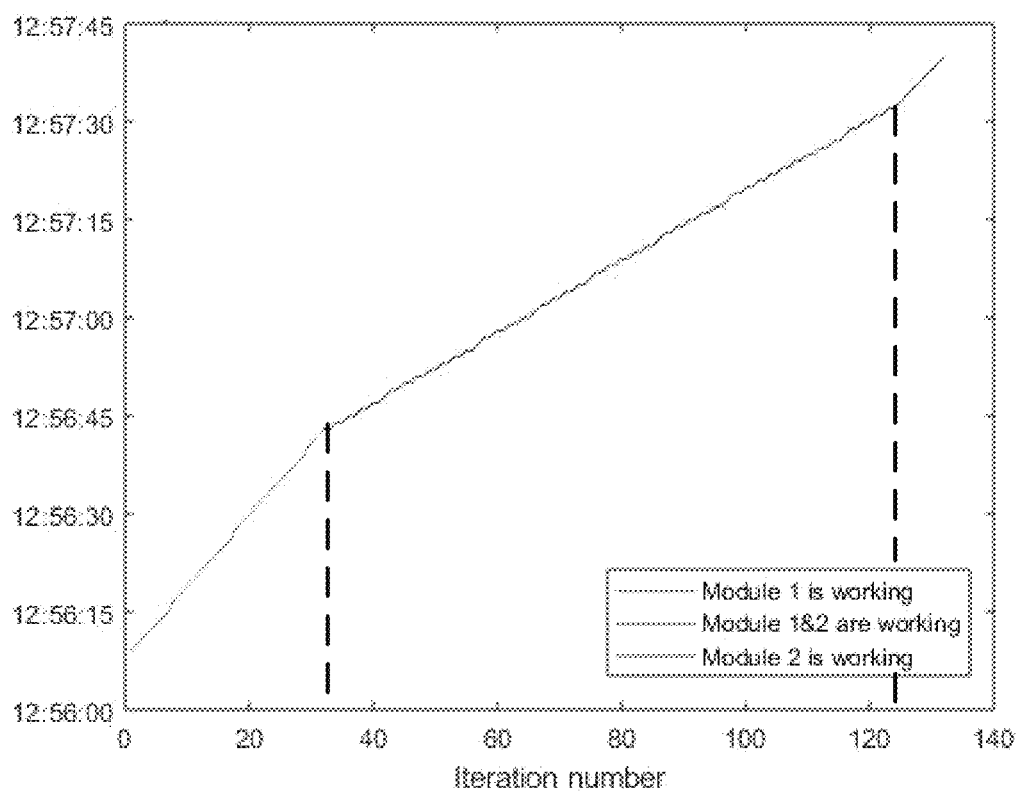
FIG. 8 is a graph showing the number of iterations performed in the determination of Pi over time as one or both of the solar servers of FIG. 6 are performing computations in accordance with some embodiments of the inventive concept.

FIG. 6 is a block diagram illustrating the computation of Pi using two solar servers 110a, 110b, and 110c. FIG. 7 is a graph showing the determination of Pi over time as one or both of the solar servers 110a, 110b, and 110c are performing computations. FIG. 8 is a graph showing the number of iterations performed in the determination of Pi over time as one or both of the solar servers 110a, 110b, and 110c are performing computations.

As shown in FIGS. 6-8 both solar servers corresponding to solar panels 01 and 02 are in a standby state at time 12:55:57. At time 12:56:16, the first solar server corresponding to panel 01 transitions to an active state and is available to perform computations. The solar server corresponding to panel 01 computes the value of Pi from time 12:56:16 to approximately 12:56:40 when the second solar server corresponding to panel 02 transitions to an active state and is available to perform computations. The first solar server performed approximately 32 iterations until approximately time 12:56:40 when the first and second solar servers perform computations in parallel. Between approximately time 12:56:40 and time 12:57:32 the two solar servers compute computations of Pi in parallel performing approximately 90 iterations during this period. The first solar server corresponding to panel 01 transitions to a standby state at this time and the second solar server corresponding to panel 02 continues performing computations until approximately time 12:57:42. The second solar server performs approximately 10 iterations during this period and transitions to a standby state at approximately time 12:57:42. As shown in FIGS. 7 and 8, the rate at which computations are performed and the rate at which the computation result converges on the value of Pi increases during the time interval when both the first and second solar servers are in a power on or active state.

Figure 9:
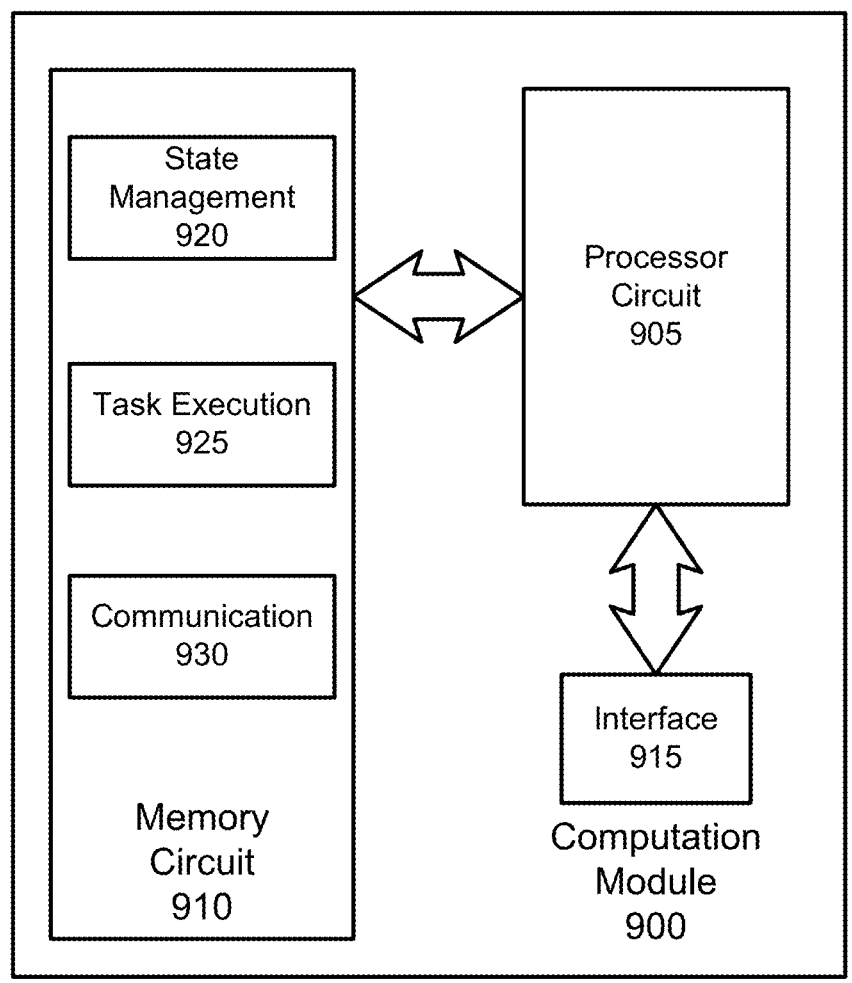
FIG. 9 is a simplified block diagram of the computation module of FIG. 1 in accordance with some embodiments of the inventive concept.

FIG. 9 is a simplified block diagram of the computation module 115a, 115b, and 115c of FIG. 1 that is configured to perform operations according to one or more embodiments disclosed herein in accordance with some embodiments of the inventive concept. The computation module 900 comprises a processor circuit 905, a memory circuit 910, and an interface 915. The interface 1015 may comprise a wireless and/or a wired interface, such as a wireless transceiver and a network adapter. The wireless transceiver and the network adapter may be configured to provide the computation module 900 with wireless and wireline communication functionality, respectively. The processor circuit 905 may comprise one or more data processing circuits, such as a general purpose and/or special purpose processor, e.g., microprocessor and/or digital signal processor. The processor circuit 905 is configured to execute computer readable program code including a state management module 920, a task execution module 925, and a communication module 930 to perform at least some of the operations described herein as being performed by the computation module 115a, 115b, and 115c of the solar servers 110a, 110b, and 110c. The state management module 920 may be configured to cooperate with the communication module 930 to communicate the state of the computation module 900 (e.g., power on/active or standby) to the data center 130 controller based on the output voltage from the solar panels 120a, 120b, and 120c. The task execution module 925 may be configured to execute the computer readable program code received and any data received from the data center 130 controller as part of a task command. The communication module 930 may be configured to implement a communication protocol, such as TCP/IP to facilitate communication between the computation module 900 and the data center 130 controller.

Figure 10:
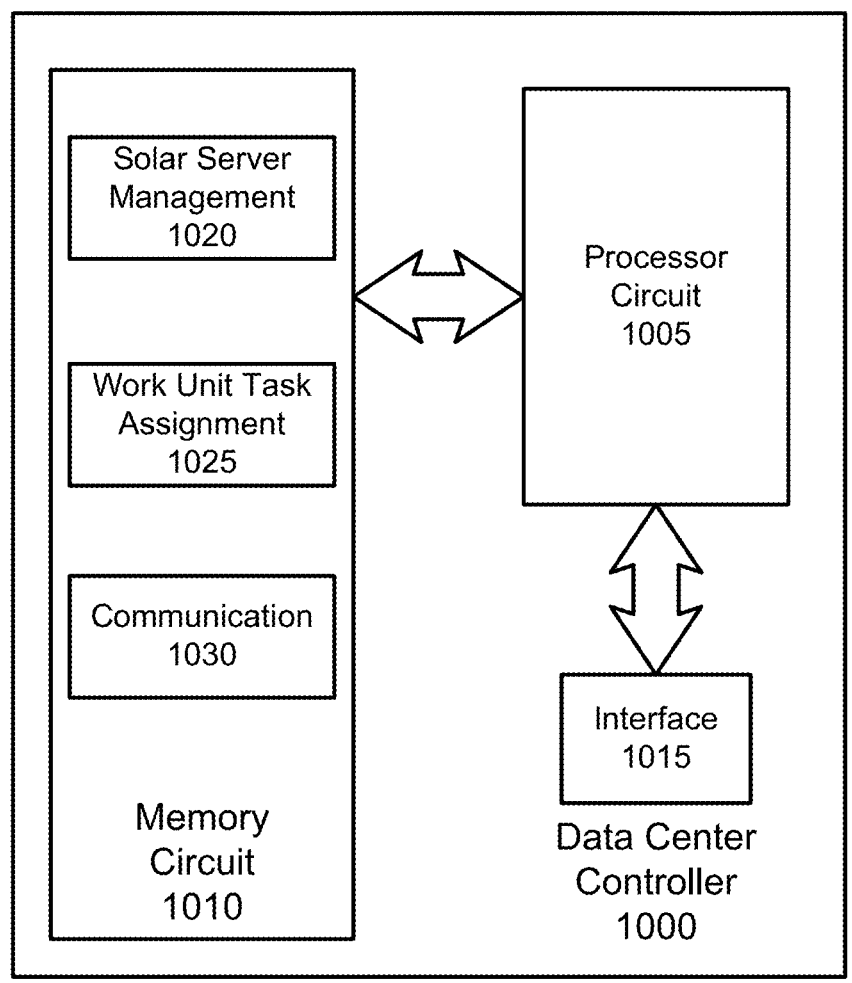
FIG. 10 is a simplified block diagram of the data center controller of FIG. 1 in accordance with some embodiments of the inventive concept.

FIG. 10 is a simplified block diagram of the data center 130 controller of FIG. 1 that is configured to perform operations according to one or more embodiments disclosed herein in accordance with some embodiments of the inventive concept. The data center controller 1000 comprises a processor circuit 1005, a memory circuit 1010, and an interface 1015. The interface 1015 may comprise a wireless and/or a wired interface, such as a wireless transceiver and a network adapter. The wireless transceiver and the network adapter may be configured to provide the data center controller 1000 with wireless and wireline communication functionality, respectively. The processor circuit 1005 may comprise one or more data processing circuits, such as a general purpose and/or special purpose processor, e.g., microprocessor and/or digital signal processor. The processor circuit 1005 is configured to execute computer readable program code including a solar server management module 1020, a work unit task assignment module 1025, and a communication module 1030 to perform at least some of the operations described herein as being performed by the data center 130 controller. The solar server management module 1020 may be configured to cooperate with the communication module 1030 to receive information on the states of the computation modules 115a, 115b, and 115c (e.g., power on/active or standby) of the various solar servers 110a, 110b, and 110c based on the output voltages from the solar panels 120a, 120b, and 120c. The work unit task assignment module 1025 may be configured to analyze a work unit involving computational operations and divide the work unit into tasks that can be assigned to one or more solar servers 110a, 110b, and 110c. The work unit task assignment module 1025 may also be configured to process the results of the computational operations performed by the solar servers 110a, 110b, and 110c and combine the results into a meaningful output for the work unit. The communication module 1030 may be configured to implement a communication protocol, such as TCP/IP to facilitate communication between the data center controller 1000 and the solar servers 110a, 110b, and 110c/computation modules 115a, 115b, and 115c.

Some embodiments of the inventive concept may provide a solar PV server array that can support a data center in a cloud computing environment. The solar energy based computation array may provide solar servers that can operate in parallel to perform computations when they have sufficient power generated in response to solar radiation incident thereon. A data center controller may assign computational tasks to those solar servers that are in an active or powered on state. Advantageously, because the solar servers are self-powered through solar PV panels and communicate with the data center controller over the Internet, no additional electrical grid infrastructure may be required.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, LabVIEW, dynamic programming languages, such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

It will be understood that, although the terms "first," "second," etc. may be used herein to describe various elements, these elements should not be limited by these terms. These terms are only used to distinguish one element from another. Thus, a first element could be termed a second element without departing from the teachings of the inventive subject matter.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

The present disclosure of embodiments has been presented for purposes of illustration and description, but is not intended to be exhaustive or limited to the disclosure in the form disclosed. Many variations and modifications can be made to the embodiments without substantially departing from the principles of the present invention. All such variations and modifications are intended to be included herein within the scope of the present invention.

What is claimed is:

1. An apparatus, comprising:
a photovoltaic module; and
a computation module that is coupled to the photovoltaic module and is configured to receive power therefrom, the computation module being configured to communicate an active message to a controller in response to the computation module transitioning to a power on state and configured to receive a task command from the controller in response to communicating the active message to the controller.

2. The apparatus of claim 1, wherein the task command comprises computer readable program code module; and
wherein the computation module is further configured to execute the computer readable program code module, further configured to generate a result based on the execution of the computer readable program code module, and further configured to communicate the result to the controller.

3. The apparatus of claim 1, further comprising:
a voltage sensor that is configured to determine a voltage level applied to the computation module;
wherein the computation module is further configured to transition to the power on state responsive to the voltage level applied to the computation module exceeding a defined threshold; and
wherein the computation module is further configured to transition to a standby state responsive to the voltage level applied to the computation module being less than the defined threshold.

4. The apparatus of claim 3, further comprising:
a rechargeable energy storage unit that is configured to receive power from the photovoltaic module;
wherein the computation module is further configured to receive power from the rechargeable energy storage unit and the photovoltaic module.

5. The apparatus of claim 4, wherein the computation module is further configured to communicate with the controller while in the standby state.

6. The apparatus of claim 5, wherein the computation module is communicatively coupled to the controller via the Transmission Control Protocol/Internet Protocol (TCP/IP).

7. The apparatus of claim 1, wherein the computation module is attached to a surface of the photovoltaic module.

8. A system, comprising:
a data center controller; and
a plurality of solar servers, each of the plurality of solar servers comprising:
a photovoltaic module; and
a computation module that is coupled to the photovoltaic module and is configured to receive power therefrom, the computation module being configured to communicate an active message to the data center controller in response to the computation module transitioning to a power on state and configured to receive a task command from the data center controller in response to communicating the active message to the controller.

9. The system of claim 8, wherein the data center controller is configured to divide a work unit into a plurality of task commands and configured to communicate the plurality of task commands to at least a portion of the plurality of solar servers.

10. The system of claim 9, wherein each of the plurality of task commands comprises a computer readable program code module; and
wherein ones of the plurality of computation modules corresponding to the at least the portion of the plurality of solar servers are further configured to execute, at least partially in parallel, the plurality of computer readable program code modules, respectively, further configured to generate a plurality of results based on the execution of the plurality of computer readable program code modules, respectively, and further configured to communicate the plurality of results to the data center controller.

11. The system of claim 8, wherein each of the plurality of solar servers further comprises:
a voltage sensor that is configured to determine a voltage level applied to the computation module;
wherein the computation module is further configured to transition to the power on state responsive to the voltage level applied to the computation module exceeding a defined threshold; and
wherein the computation module is further configured to transition to a standby state responsive to the voltage level applied to the computation module being less than the defined threshold.

12. The apparatus of claim 11, wherein each of the plurality of solar servers further comprises:
a rechargeable energy storage unit that is configured to receive power from the photovoltaic module;
wherein the computation module is further configured to receive power from the rechargeable energy storage unit and the photovoltaic module.

13. The apparatus of claim 12, wherein the computation module is further configured to communicate with the data center controller while in the standby state.

14. The apparatus of claim 13, wherein the computation module is communicatively coupled to the data center controller via the Transmission Control Protocol/Internet Protocol (TCP/IP).

15. The apparatus of claim 8, wherein the computation module is attached to a surface of the photovoltaic module.

16. A method, comprising:
receiving power at a computation module from a photovoltaic module;
communicating an active message from the computation module to a controller in response to the computation module transitioning to a power on state; and
receiving a task command at the computation module from the controller in response to communicating the active message to the controller.

17. The method of claim 16, wherein the task command comprises computer readable program code; and
wherein the method further comprises:
executing the computer readable program code using the computation module;
generating a result a result based on the execution of the computer readable program code module; and
communicating the result to the controller.

18. The method of claim 16, further comprising:
determining a voltage level applied to the computation module using a voltage sensor;
transitioning the computation module to the power on state responsive to the voltage level applied to the computation module exceeding a defined threshold; and transitioning the computation module to a standby state responsive to the voltage level applied to the computation module being less than the defined threshold.

19. The method of claim 18, further comprising:

storing power in a rechargeable energy storage unit that is coupled to the photovoltaic module; and receiving power at the computation module from the rechargeable energy storage unit and the photovoltaic module.

20. The method of claim 19, further comprising:

communicating with the controller while the computation module is in the standby state.

\* \* \* \* \*